W. A. KEYS.
NECKWEAR.
APPLICATION FILED MAR. 27, 1914.
Reissued Oct. 27, 1914. 13,818.
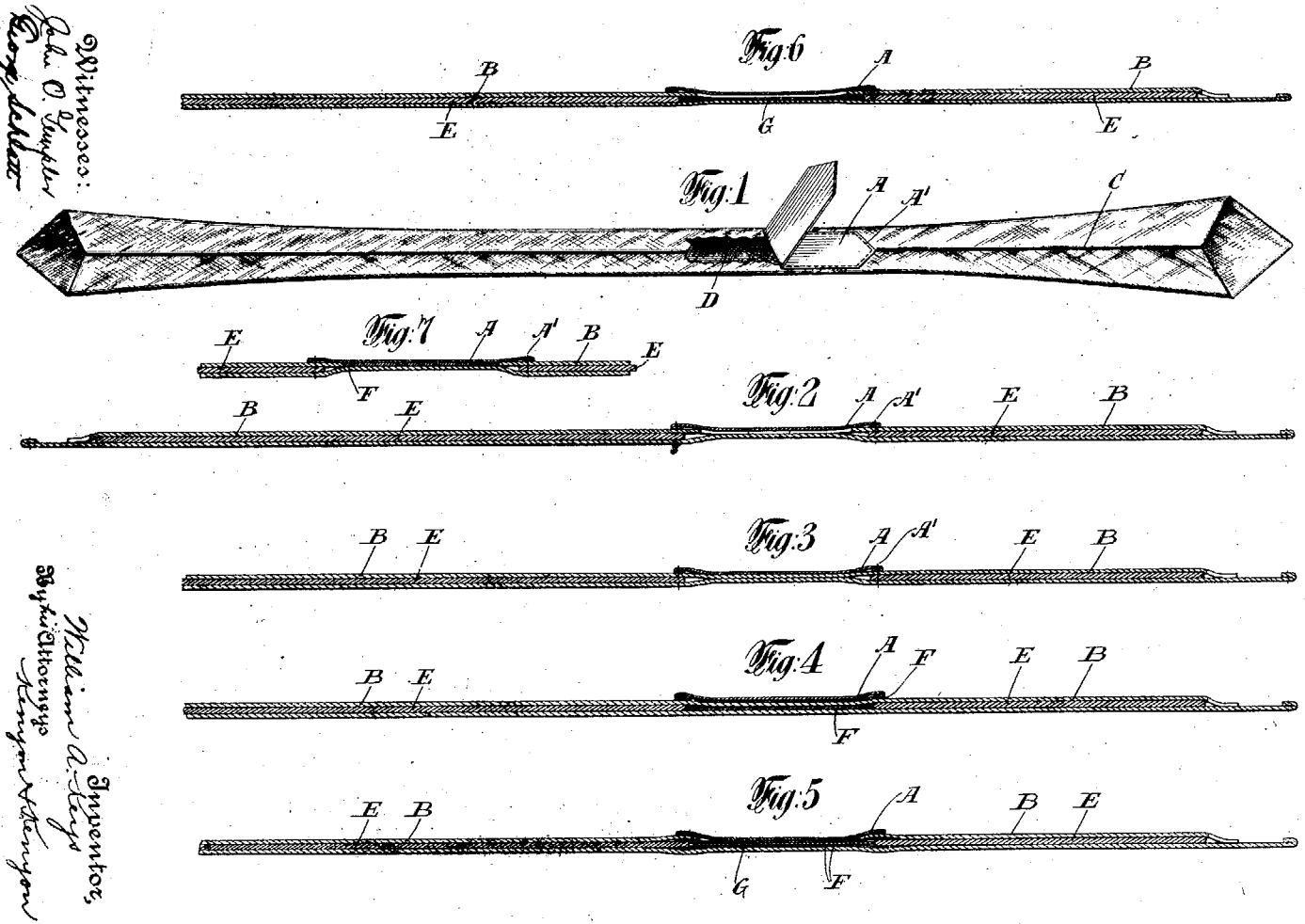
Witnesses:
John O. Sempler
George Schlatt
Inventor,
William A. Keys
By his Attorneys
Kenyon & Kenyon

UNITED STATES PATENT OFFICE.

WILLIAM A. KEYS, OF NEW YORK, N. Y., ASSIGNOR TO SLIP SCARF COMPANY, A CORPORATION OF NEW YORK.

NECKWEAR.

13,818. Specification of Reissued Letters Patent. Reissued Oct. 27, 1914.

Original No. 923,534, dated June 1, 1909, Serial No. 471,086. Application for reissue filed March 27, 1914. Serial No. 827,756.

*To all whom it may concern:*

Be it known that I, WILLIAM A. KEYS, a citizen of the United States, and a resident of the city, county, and State of New York, have invented certain new and useful Improvements in Neckwear, of which the following is a specification.

My invention relates to neckwear, and is adapted to any form of neckwear, either four-in-hand ties, ascots, or what are commonly known as string ties, but it is especially adapted for neckwear to be worn with what are known as two-fold collars, which are in vogue at the present time.

As is well known to any one using two-fold collars, after the tie has been placed between the folds of the collar and the collar is in position around the wearer's neck it is almost impossible without destroying the tie to adjust same around the neck of the wearer by pulling it to the right or left side according to the position in which it is desired to adjust it. It is to overcome this, and further to overcome the disadvantage which sometimes occurs by having the seam in the neck-tie catch onto the rear collar button, making it impossible to move the neck-tie to the right or left without tearing same. I have found that by the application, on the inside of the neckband, of a strip of very smooth fabric, which in its relation to the material from which the neck-tie is made is a relatively anti-friction material, it is possible to overcome many of these difficulties, and in conjunction with this I have found that it is preferable to cut away a portion of the fabric of the inner part of the neckband which is covered by this strip of relatively anti-friction material, thereby making the tie thinner at that point than it would otherwise be.

In the drawings I have shown in Figures 1 and 2 my preferred form, while in Figs. 3, 4, 5, 6 and 7 I have shown possible modifications; all being addressed to the application of the anti-friction material with various means for making the neckband of the tie thinner at the point where the anti-friction material has been placed.

In the drawings, A represents the strip of anti-friction material which is preferably made of a very smooth satin or silk ribbon, but, of course, I do not limit myself to the material from which it is made. This strip of material is secured to the neckband by a row of stitching marked A′, which engages with all the plies of the neckband, as shown in Figs. 2, 3 and 7. The row of stitching marked A′ which secures the strip of material to the neckband also engages with and holds in place the interlinings, as shown in Figs. 2 and 3.

B, B are the tying ends of the tie.

In the ordinary manufacture of neckwear at the present time it is the practice to fold the neckwear and have the folds come together at the line marked C and secured to each other by a row of stitching. This generally comes near or in the center of the neckband and on the inner side so that it is possible for same to catch on the collar button of the wearer. The strip of anti-friction material A is, as shown in Fig. 1, after a portion of the inner band of the tie has been cut away, as shown at D, placed over the neckband and secured thereto. In order to make the neckband thin I make the interlinings E, E, either independent of each other and secure them within the tie, as shown in Fig. 2, or I secure them together by a thin strip of linen or muslin or other fabric G, as shown in Fig. 6.

My improved neck-tie may also be made as shown in Fig. 3, by omitting to cut away the portion of the neckband marked D in Fig. 1, or the neckband may be made substantially solid by cementing it together, as shown in Figs. 4 and 5, in which I have shown in Fig. 4 a strip of rubber cement or other material placed between the anti-friction strip A and the inner side of the neckband which in this figure has not been cut away, then another row of cement between the inner and outer ply of the neck-tie proper, which neck-tie has no interlining in the neckband but has independent interlinings in the tying ends.

In Fig. 5 I have shown my invention made the same as Fig. 6, except that I have placed between the three loose plies two strips of cement such as rubber, so that by the application of heat the plies of the fabric shown in Figs. 4 and 5 may all become secured to each other so as to form a solid neckband.

In Fig. 7 I have shown a modification of Figs. 1 and 2 in which I cement the inner

BEST AVAILABLE COPY side of the outer face of the neck-tie to the inner side of the anti-friction strip by cement marked F.

Many modifications might be made in addition to those shown without departing from the spirit of my invention.

What I claim as new and desire to secure by Letters Patent is:—

1. In a neck tie, the combination of a neckband and two tying ends, a portion of the inner band only of the neck tie cut away and a strip of anti-friction fabric substituted therefor.

2. In a neck tie, the combination of a neckband and two tying ends, a portion of the inner face only of the neckband being made of substantially anti-friction fabric, said portion of the neckband being made substantially solid by cementing the several plies together.

3. In a neck tie, the combination of a neckband and two tying ends, a portion of the inner face of the neckband being made of substantially anti-friction fabric, said portion of the neckband being made substantially solid by cementing by waterproof cement the several plies of the neckband.

4. In a neck tie, the combination of a neckband and two tying ends, a portion of the inner face of the neckband being cut away and a strip of relatively anti-friction fabric substituted therefor, and a portion of said neckband being made substantially solid by cementing the several plies together.

5. In a neck tie, the combination of a neckband and two tying ends formed of an interlining thinner in an intermediate portion than in the tying ends and a cover fabric folded thereon, a strip of anti-friction fabric on the inner face only of the neckband substantially the width of the neckband, and rows of stitching fixedly securing said strip of material to all the plies of the said cover fabric in the neckband.

6. In a neck tie, the combination of a neckband and two tying ends, a portion of the inner face only of the neckband formed of a strip of substantially anti-friction fabric independent interlinings in the tying ends, and rows of stitching fixedly securing said anti-friction fabric to the neckband, said stitching also engaging the inner adjacent ends of said interlining.

7. In a neck tie, the combination of two tying ends and a neckband, a portion of the inner side only of the neckband being cut away and a relatively anti-friction fabric substituted therefor an interlining in said necktie substantially thinner in a portion of the neckband than in the tying ends, and rows of stitching fixedly securing said anti-friction fabric to all the plies of the neckband, said stitching also engaging the inner adjacent ends of the portions of the interlining of the tying ends.

8. In a necktie, the combination of a neckband and two tying ends, a portion, of the inner face only, of the tie formed of a strip of relatively smooth ribbon, and stitching securing said strip to all the plies of the neckband of the tie.

In testimony whereof, I have signed my name to this specification, in the presence of two subscribing witnesses.

WILLIAM A. KEYS.

Witnesses:
GEO. W. MILLS, JR.,
EDWIN SEGER.